United States Patent [19]

Carraro et al.

[11] Patent Number: 5,340,137
[45] Date of Patent: Aug. 23, 1994

[54] STEERING AXLE

[75] Inventors: Timante Carraro, Campodarsego; Raimondo Perin, Borgoricco, both of Italy

[73] Assignee: Carraro S.p.A., Campodarsego, Italy

[21] Appl. No.: 901,016

[22] Filed: Jun. 19, 1992

[30] Foreign Application Priority Data

Jun. 25, 1991 [EP] European Pat. Off. ........ 91830279.5

[51] Int. Cl.$^5$ .............................................. B62D 7/18
[52] U.S. Cl. .................................... 280/96.1; 180/254
[58] Field of Search .................. 280/95.1, 846, 96.1, 280/93, 660, 670; 180/253, 254

[56] References Cited

U.S. PATENT DOCUMENTS

| 1,783,614 | 6/1927 | Griswold | 280/96.1 |
| 2,197,889 | 6/1938 | Katcher | 403/51 |
| 2,512,881 | 10/1948 | Smiley, Jr. | 384/396 |
| 3,024,050 | 3/1962 | Moskovitz | 280/96.1 X |
| 3,472,331 | 10/1969 | Baker et al. | 280/96.1 X |
| 3,542,392 | 11/1970 | Cumming | 280/96.1 |
| 3,549,166 | 12/1970 | Moore | 280/96.1 |
| 3,563,564 | 2/1971 | Bartkowiak | 2380/96.1 |
| 3,758,129 | 9/1973 | Ishikawa et al. | 280/96.1 |
| 4,037,680 | 7/1977 | Grove | 180/254 |
| 4,195,862 | 4/1980 | Specktor et al. | 180/253 X |
| 4,635,952 | 1/1987 | Smith | 280/96.1 |
| 4,690,418 | 9/1987 | Smith | 280/96.1 |
| 4,786,114 | 11/1988 | Steiner et al. | 280/96.1 X |

FOREIGN PATENT DOCUMENTS 1125260 8/1968 United Kingdom .

Primary Examiner—Margaret A. Focarin
Assistant Examiner—Florian Zeender
Attorney, Agent, or Firm—Sughrue, Mion, Zinn, Macpeak & Seas

[57] ABSTRACT

A steering axle is disclosed which comprises a girder having a respective wheel hub spindle hinged to its opposed ends by means of two hinges. An elastic element, such as a Belleville washer, is fitted between the elements of one of the hinges for adjusting the backlash between the girder and the spindle.

4 Claims, 1 Drawing Sheet

STEERING AXLE

BACKGROUND OF THE INVENTION

This invention relates to a steering axle comprising a girder to the opposed ends whereof a respective spindle of a wheel hub is attached hingedly by means of first and second hinges which are coaxial and subjected in use to mixed axial and radial loads and to substantially radial loads respectively, said first and second hinges comprising respective hinge elements formed on said girder and the corresponding spindle, between the elements of at least one of said hinges there being interposed a means of adjusting assembly backlash.

In this environment, in order to suitably adjust the backlash between the hinge elements of the girder and the spindle, respectively, of an axle, shims are provided which fit between the hinge elements.

A disadvantage of such an approach is that the amount of shimming required must be found by a trial and error process until a desired amount of backlash is achieved between the girder and the spindle.

This technology involves axle assembly and setting procedures which are comparatively intensive in cost and time.

Furthermore, axles made in accordance with the prior art include, for each hinge, bearings mounted in suitable seats which require greasing at periodical intervals. For greasing the bearings, lubricating holes and respective grease fittings are provided on the knuckle pin of the hinge. It is also necessary that dust covers be provided between the hinge pins and the bearing seats. Such covers protect the hinge elements and lubricant against such contaminants as dust, mud, dirt, while opposing outward lubricant leakage.

This construction brings about complications in manufacture, operation, and maintenance of the hinge between the girder and the spindle.

The underlying technical problem of this invention is to provide an axle structure so configured as to eliminate the need for adjusting the backlash between the girder and the spindle by successive trial-and-error steps.

SUMMARY OF THE INVENTION

This problem is solved according to the invention by a steering axle as specified in the preamble being characterized in that said means of adjustment comprises an elastic element placed between said hinge elements with a selected amount of pre-load.

Advantageously, the invention can also improve the effectiveness of the sealing arrangement provided to protect the bearings and hinge pins, thereby the hinges will require no further servicing after the original greasing step during their assembly.

This is accomplished by that the elastic element is a Belleville washer serving as a seal between the hinge elements.

BRIEF DESCRIPTION OF THE DRAWING

The invention will be now described in detail with reference to a preferred embodiment thereof, shown by way of non-limitative example in the accompanying drawing, where.

DETAILED DESCRIPTION OF THE INVENTION

Figure 1:
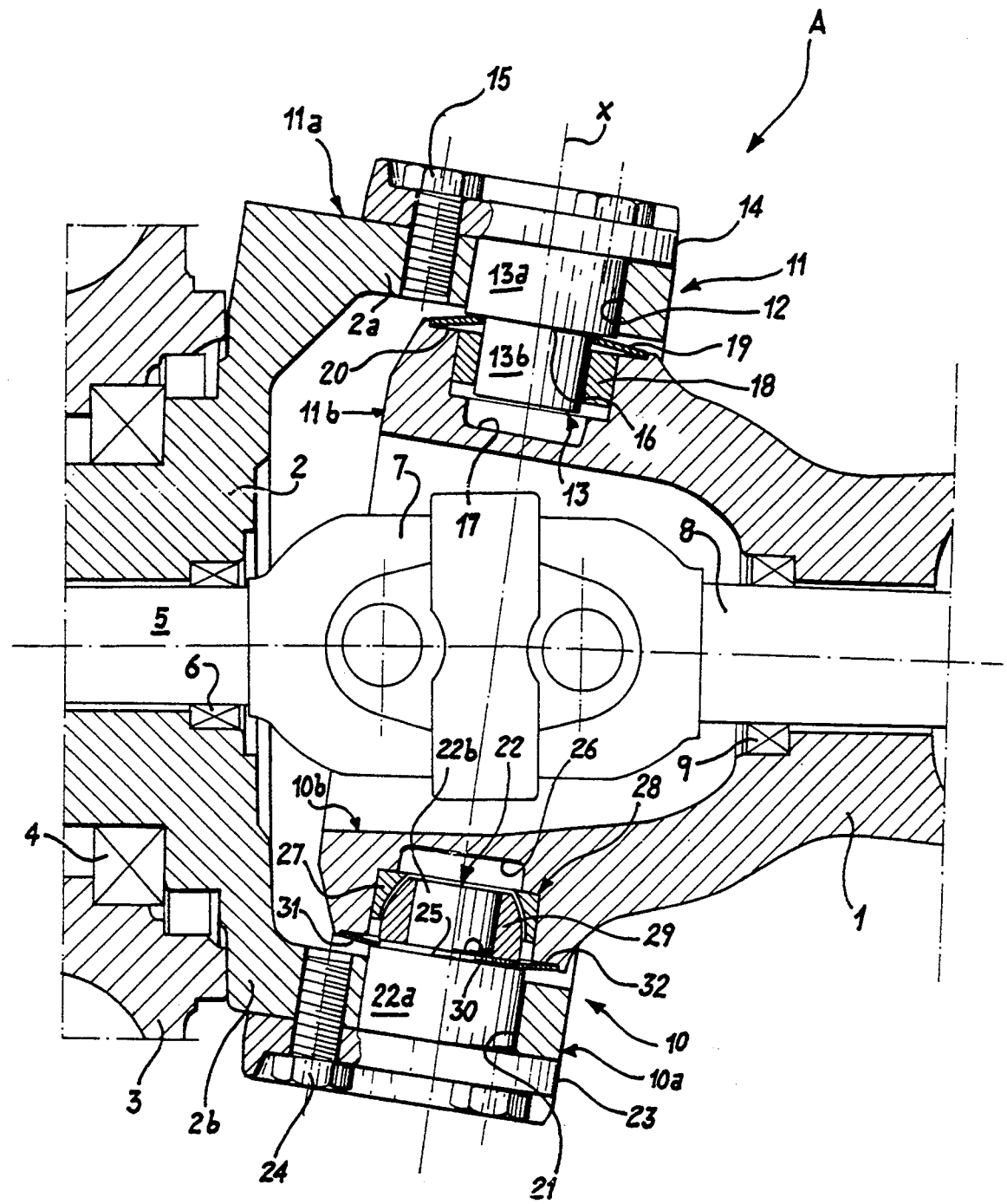
FIG. 1 is a fragmentary longitudinal section view of an axle according to the invention.

With reference to the drawing, an axle, generally indicated at A, comprises a girder 1 having, hingedly connected to the opposed ends thereof, a respective spindle 2 which carries a hub 3 (both only partially shown in FIG. 1).

The hub 3 is journalled on the spindle 2 through a bearing 4; journalled inside the spindle is a stub shaft 5 having a seal 6.

The stub shaft 5 is connected, through an equal-velocity universal joint 7, to an axle shaft 8, which is journalled inside the girder 1 and provided with a seal 9.

The girder 1 and spindle 2 are connected pivotally by means of first and second hinges 10 and 11, respectively, about an axis X.

The second hinge 11 comprises two hinge elements, generally shown at 11a and 11b.

Hinge element 11a includes an arm 2a cantilevered from the spindle 2 and being passed through by a bore 12. A pin 13, provided with a flange 14, is engaged in the bore 12 and is attached to the arm 2a by means of screws 15. This pin 13 consists of two coaxial cylindrical sections 13a and 13b having different diameters. A shoulder 16 is defined between the cylindrical sections 13a, 13b.

The other element 11b of the hinge 11 has a blind socket 17 formed in the girder end and receiving a bearing 18 which is subjected in use to substantially radial loads.

A backlash adjuster means is provided between the hinge elements 11a and 11b of hinge 11. This means comprises a Belleville washer 19 acting between the shoulder 16 and a sealing flat 20 formed around the mouth of socket 17.

The first hinge 10 comprises two hinge elements, generally shown at 10a and 10b. Element 10a has an arm 2b cantilevered from the spindle 2 and being passed through by a bore 21.

A pin 22 having a flange 23 is engaged in the bore 21 and is attached to the arm 2b by means of screws 24. Said pin 22 has two coaxial cylindrical sections 22a and 22b with different diameters, wherebetween a shoulder 25 is defined.

The other element 10b of hinge 10 includes a blind socket 26 which accommodates a race 27 of a plain bearing 28 the other race 29 whereof is engaged on section 22b of pin 22 where it abuts against a shoulder 30.

Provided between the socket 26 and the pin 22 is a seal means which comprises a Belleville washer 31 arranged to act between the shoulder 25 and a sealing flat 32 formed around the mouth of socket 26.

In assembling the axle A spring 19 is fitted between the hinge elements 11a and 11b with a selected amount of pre-load. Thus, the axial pre-load of washer 19 combined with the load impinging on the girder will hold the races 27 and 29 of bearing 28 in rubbing contact.

However, said washer 19 should be selected to hinder relative displacement of the pins 13 and 22 and respective bearings 18 and 28 along the direction of axis X—X, and accordingly, maintain the rubbing contact between the races 27 and 29 of bearing 28 on the occurrence of a change in the load impinging on the axle (e.g., with a wheel associated with one of the axle hubs hanging). The suppression of such relative shifts between the pins 13 and 22 and the bearings 18 and 28 along direction X—X will stop any reciprocating movement of the pins in their seats and consequent pumping effect on the lubricant and the contaminants, respectively from and toward the seat.

Washer 31 is only subjected to its assembly pre-loading as brought about by the relative positions of the shoulder 25 on pin 22 and the sealing flat 32 on girder 1. It only serves a sealing function for socket 26 and pin 22, and bears no effect on the adjustment of the assembly backlash, because of its spring loading being set much lower than the spring loading of washer 19.

Numerous are the advantages afforded by this invention over the prior art.

Among these is the elimination of the backlash adjusting step between the girder and the spindle. This reflects in reduced assembly times and related costs.

In addition, by the provision of optimum protection for the bearing seats and the hinge lubricant, the invention allows the hinges to be life lubricated during the axle assembly process, thus making the arrangements for periodically greasing said bearings unnecessary and simplifying the hinge parts machining. In addition, the maintenance operations are made advantageously simpler.

We claim:

1. A steering axle comprising a girder to the opposed ends whereof a respective spindle of a wheel hub is attached hingedly by means of first and second hinges which are coaxial with the first hinge being subjected in use to mixed axial and radial loads and with the second hinge being subject in use to substantially radial loads, said first and second hinges comprising respective hinge elements formed on said girder and the corresponding spindle, between the elements of at least said second hinge there being interposed a means of adjusting assembly backlash wherein said second hinge includes a first element having a socket for seating a bearing therein and a second element having a hinge pin engaged in said bearing and wherein said means of adjusting the backlash comprises a Belleville washer placed between said socket and a shoulder on said hinge pin with a selected amount of pre-load and to form a seal between said socket and said hinge pin.

2. An axle according to claim 1, wherein one element of the first hinge has a socket for seating a bearing therein and another element has a hinge pin engaged in said bearing, a second Belleville washer being arranged between said socket of said one element and a shoulder on said pin of said another element to act as a seal between the socket and the pin of said first hinge.

3. An axle according to claim 2, wherein a sealing flat is formed around a mouth of each socket, and each washer is placed between the shoulder on each pin and each sealing flat.

4. An axle according to claim 3, wherein the washer intervening between the elements of the first hinge has a lower elastic constant than the washer intervening between the elements of the second, hinge.

* * * * *